(12) United States Patent
Lin et al.

(10) Patent No.: US 7,993,059 B2
(45) Date of Patent: Aug. 9, 2011

(54) ANTI-DUST STRUCTURE FOR A SLIDING BLOCK OF A LINEAR GUIDEWAY

(75) Inventors: Yun-Yi Lin, Changhua County (TW); Hsin-Tsun Hsu, Changhua County (TW)

(73) Assignee: Hiwin Technologies Corp., Taichung (TW)

( * ) Notice: Subject to any disclaimer, the term of this patent is extended or adjusted under 35 U.S.C. 154(b) by 496 days.

(21) Appl. No.: 12/203,838

(22) Filed: Sep. 3, 2008

(65) Prior Publication Data
US 2009/0058009 A1 Mar. 5, 2009

Related U.S. Application Data

(63) Continuation-in-part of application No. 11/308,357, filed on Mar. 18, 2006, now abandoned.

(51) Int. Cl.
*F16C 29/08* (2006.01)
*F16C 29/06* (2006.01)
(52) U.S. Cl. ............................................ 384/15; 384/45
(58) Field of Classification Search .................... 384/15, 384/43–45
See application file for complete search history.

(56) References Cited

U.S. PATENT DOCUMENTS

| | | | |
|---|---|---|---|
| 4,918,846 A | | 4/1990 | Tsukada |
| 5,492,412 A | * | 2/1996 | Tsukada .......................... 384/15 |
| 5,588,750 A | * | 12/1996 | Osawa et al. .................... 384/15 |
| 5,871,282 A | | 2/1999 | Yuasa |
| 6,113,272 A | * | 9/2000 | Michioka et al. ............... 384/15 |
| 6,851,857 B2 | * | 2/2005 | Miyata .............................. 384/45 |
| 6,857,780 B2 | * | 2/2005 | Morr et al. ....................... 384/15 |

* cited by examiner

*Primary Examiner* — Thomas R Hannon

(57) ABSTRACT

An anti-dust structure for a sliding block of a linear guideway comprises a sliding block, two end caps, plural rolling elements, a flexible anti-dust strip and a rail. The two end caps are assembled to both ends of the sliding block, the rolling elements are disposed on the rail. Between the end cap and the sliding block is defined a circulating path. The two end caps are each extended from an inner side thereof to form a linking portion, and the two linking portions of the two end caps are linked to each other to define an endless positioning groove including two longitudinal grooves and two transverse grooves. The flexible anti-dust strip is disposed in the positioning groove of the end caps and integrally formed with protruding lip portions for cooperating with the two longitudinal grooves.

3 Claims, 6 Drawing Sheets

ANTI-DUST STRUCTURE FOR A SLIDING BLOCK OF A LINEAR GUIDEWAY

This application is a continuation in part of U.S. patent application Ser. No. 11/308,357, which claims the benefit of the earlier filing date of Mar. 18, 2006 now abandoned. Claim 1 of this application is a combination of previous claims 1-3 of the U.S. patent application Ser. No. 11/308,357 and added with the features of "two end caps, a plurality of rolling elements and a rail", Claims 2-3 of this application correspond to the previous Claims 4-6 of the U.S. patent application Ser. No. 11/308,357.

BACKGROUND OF THE INVENTION

1. Field of the Invention

The present invention relates to a linear guideway, and more particularly to an anti-dust structure for a sliding block of a linear guideway, which can use the flexible anti-dust strip to scrape off the grease and dust accumulated on the top surface of the rail at any time, preventing the dust and grease entering the upper rolling element groove via the top surface of the rail, and thus obtaining a better anti-dust function and ensuring the service life of the linear guideway.

2. Description of the Prior Art

A linear guideway is normally provided in its upper inner surface of the sliding block with an anti-dust structure that is located correspondingly to the upper ball groove for preventing dust or grease from accumulating on the top surface of the rail. The anti-dust structures commonly seen include the following two types:

A first conventional anti-dust structure disclosed by U.S. Pat. No. 4,918,846 is shown in FIG. 1, a U-shaped anti-dust plate 10 is fixed to the end of the sliding block by screws. The anti-dust plate 10 is made of spring steel and formed by punch forming, and then the lip portion 11 is fixed at either side of the anti-dust plate 10 (can be fixed by bonding method). The method of fixing the plate 10 on the sliding block includes two types: first, drilling a plurality of threaded holes in the sliding block for engaging with the screws of the anti-dust plate 10; second, an oil nozzle structure is formed in the outer end of the sliding block for fixing the anti-dust plate 10. The lip portion 11 is adapted to scrape dust and grease off the top surface of the rail. However, this conventional product is impractical because of the following reasons:

First, in addition to the complicated assembly process, it should use a plurality of screws to fix the anti-dust plate 10, and some anti-dust plates 10 should be fixed by using the oil nozzle structure. Obviously, it is uneconomic since the resultant production cost is pretty high.

Second, the production process is complicated, the producer has to punch the anti-dust plate 10, and then fix the lip portion 11 on it, and the sliding block also needs to be drilled.

Third, the lip portion 11 is easily broken off after bonding, it is impossible to use soft flexible material (soft flexible material is more difficult to be positioned by bonding), therefore, the dust accumulated inside the lip portion 11 still can enter the upper ball groove easily.

Fourth, the lip portion 11 is bonded to the anti-dust plate 10, the lip portion 11 and the anti-dust plate 10 must be replaced together once one of them is broken, and the replacement work requires the user to unscrew the screws with tools. Therefore, the maintenance of the lip portion 11 is not easy.

To solve the abovementioned problems, another conventional anti-dust structure was developed, which is disclosed by U.S. Pat. No. 5,871,282 as shown in FIG. 2.

This anti-dust structure is a metal plate 13 directly mounted on the top inner surface of the sliding block 12 by screws 16, and a pair of lip portions 14 is integrally formed with the plate 13 during injection molding process. With the injection molding process, the lip portions 14 can be made of flexible material. For obtaining a better positioning effect, the lip portions 14 must be formed by two steps: the harder portion is firstly formed on the plate 13, then the softer layer with flexibility for contacting the top surface of the rail 15 is formed on the harder portion. Although the second conventional anti-dust structure has been improved, it is still not very practical because of the following reasons:

First, it still needs to use the screws 16 to fix the metal plate 13 and the lip portions 14, the resultant production cost is high.

Second, the production process is still complicated despite the assembly is simple, because the lip portions 14 should be formed by two steps, which involves two materials and many processes.

Third, the pair of lip portions 14 is formed by injection molding, it can't be required, and once it is broken, the whole anti-dust system must be replaced, and the replacement work requires the user to unscrew the screws with tools. Therefore, the maintenance of the lip portion 11 is not easy.

To solve the aforementioned problems, the inventor of this invention, on the basis of the accumulated experience and skills associated with the linear transmission field, develops a simple structured, low cost anti-dust structure with improved anti-dust effect used on a sliding block of a linear guideway.

SUMMARY OF THE INVENTION

The Technical Problems to be Solved:

The conventional anti-dust structure for a sliding block of a linear guideway is normally fixed by plural screws, and uneconomic due to high production cost. In addition, the relevant production process is quite complicated, and the maintenance is not easy.

In order to solve the above technical problems, the present invention provides an anti-dust structure for a sliding block of a linear guideway comprising a sliding block, two end caps, plural rolling elements, a flexible anti-dust strip and a rail.

The end caps are assembled to both ends of the sliding block, and the sliding block is moveably mounted on the rail through the rolling elements.

Between each of the ends caps and the sliding block is defined a circulating path, the two end caps are each extended from an inner side thereof to form a linking portion, and the two linking portions of the two end caps are linked to each other to define an endless positioning groove including two longitudinal grooves and two transverse grooves. The two longitudinal grooves are parallel to an axis of the inner surface of the sliding block. In addition, the two transverse grooves are disposed in two end edges of the two end caps, respectively.

The flexible anti-dust strip is integrally formed with protruding lip portions for mating with the two longitudinal grooves of end caps. The flexible anti-dust strip is disposed in the positioning groove of the end caps, and the protruding lip portions of the flexible anti-dust strip protrude out of the two longitudinal grooves. Additionally, the flexible anti-dust strip is pressed into the two transverse grooves. By such arrangements, the flexible anti-dust strip can be firmly positioned and impossible to disengage from the positioning groove.

The primary objective of the present invention is to provide a simply structured and low cost anti-dust structure for a sliding block of a linear guideway, which can achieve the anti-dust effect by providing a positioning groove in the end caps and positioning a flexible anti-dust strip having protruding lip portions in the positioning groove.

The secondary objective of the present invention is to provide an anti-dust structure used on a sliding block of a linear guideway that the present invention only needs to use a flexible anti-dust strip that can be easily positioned in a positioning groove of the end caps, and the protruding lip portions are integrally formed with the flexible anti-dust strip. Such arrangement allows the user to assemble and replace the anti-dust structure very easily and quickly.

DETAILED DESCRIPTION OF THE PREFERRED EMBODIMENT

The present invention will be clearer from the following description when viewed together with the accompanying drawings, which show, for purpose of illustrations only, the preferred embodiment in accordance with the present invention.

Figure 1:
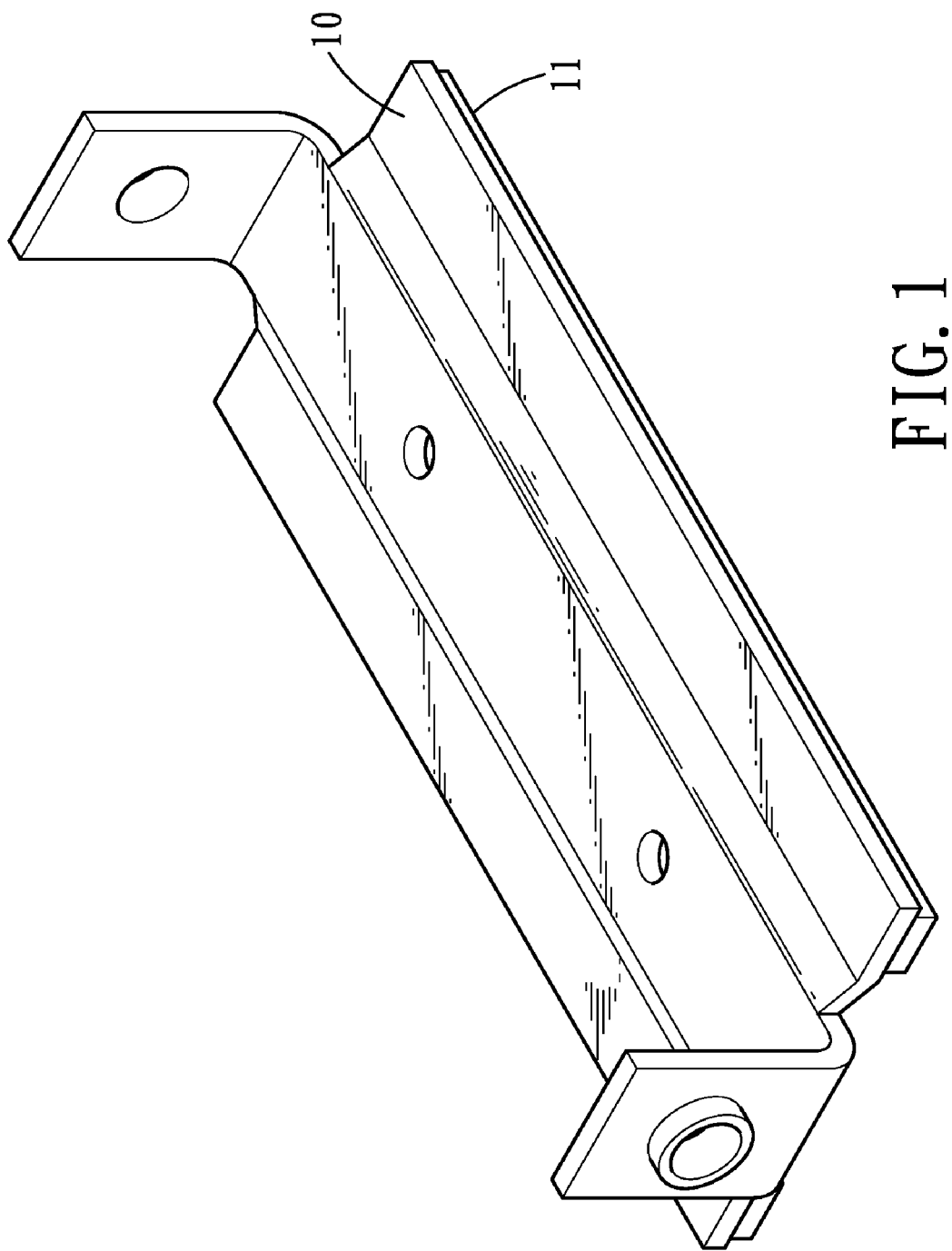
FIG. 1 is a perspective view of a first conventional U-shaped anti-dust plate.
Figure 2:
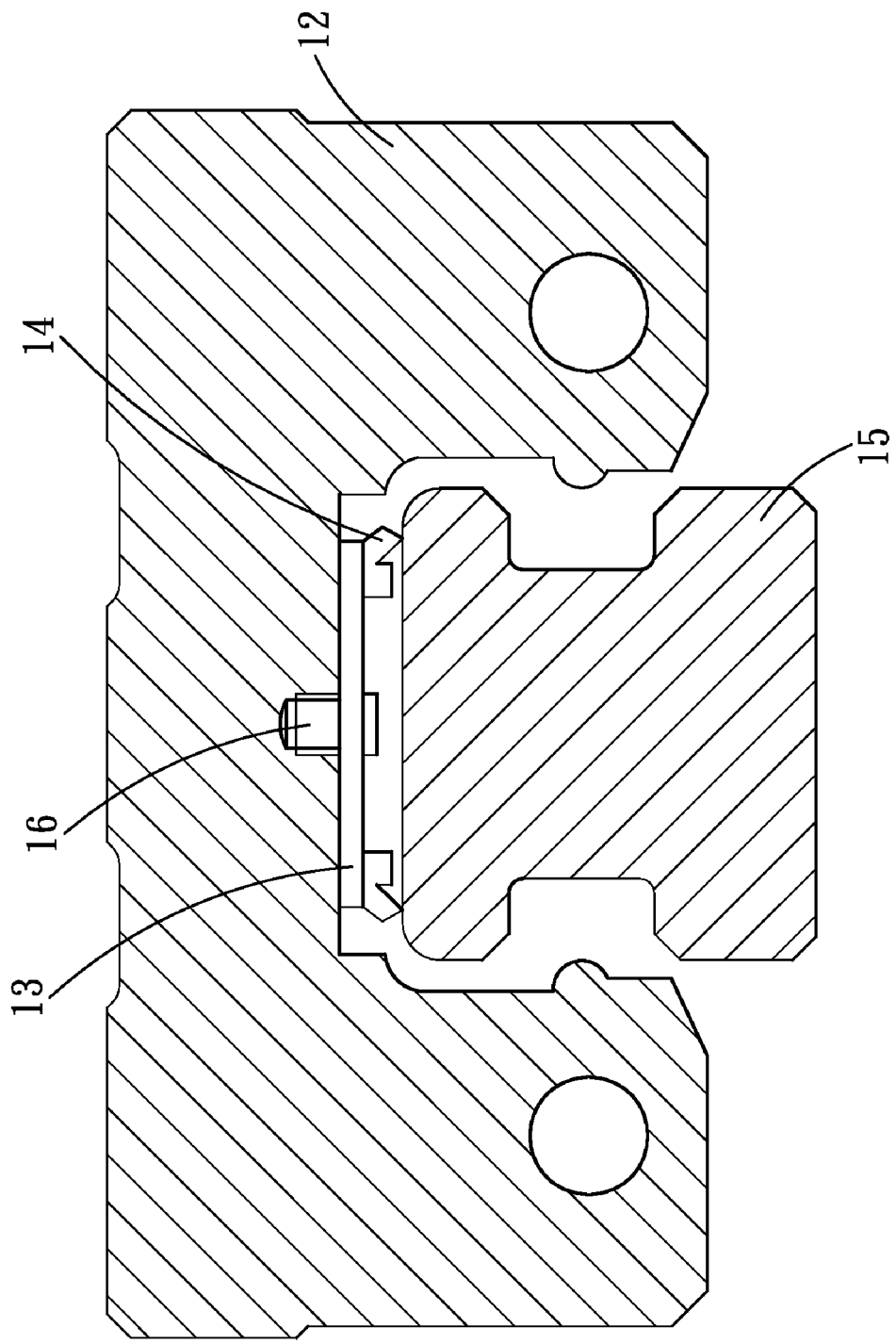
FIG. 2 is a cross sectional view of a second conventional anti-dust structure for a sliding block of a linear guideway.
Figure 3:
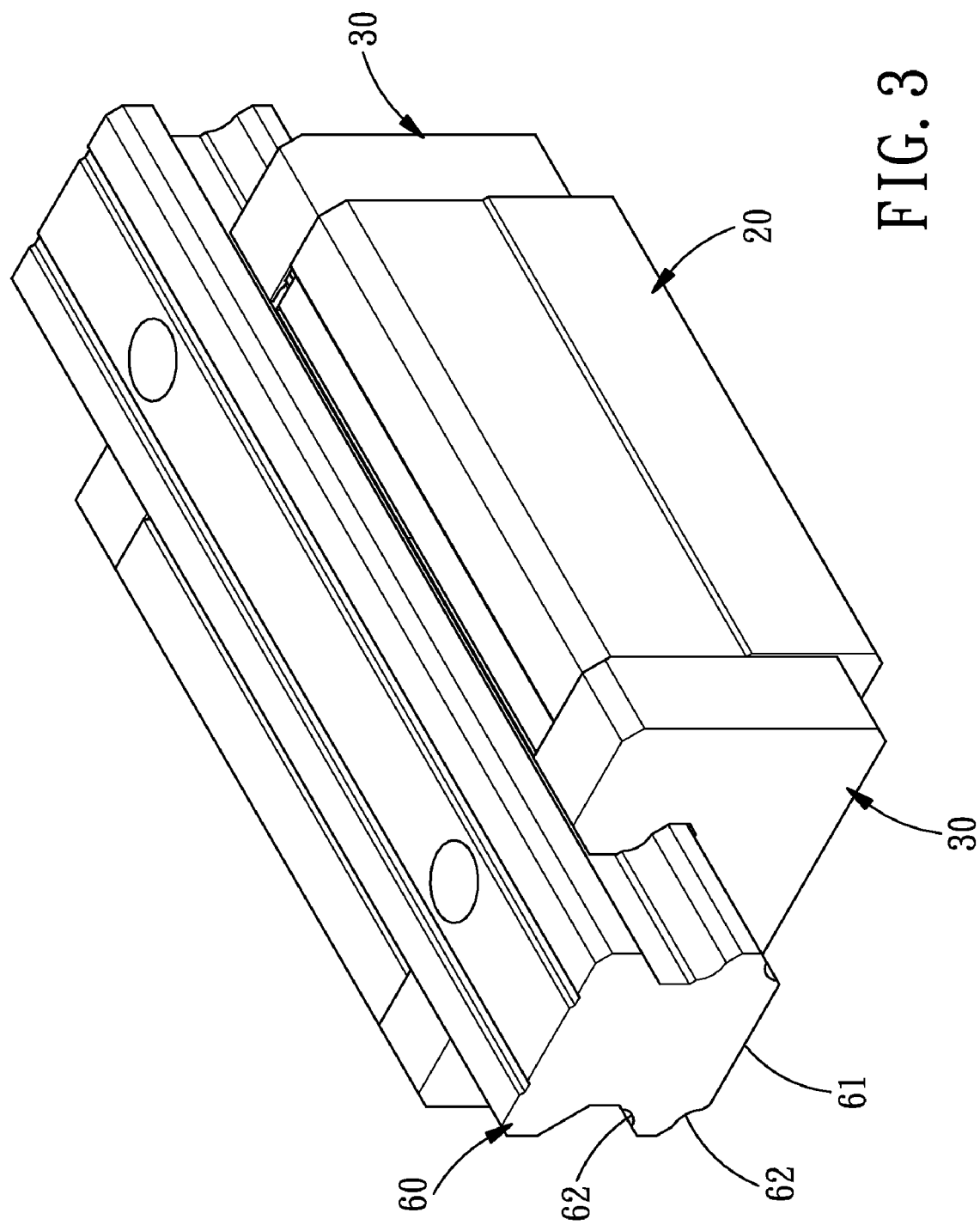
FIG. 3 is a perspective view of an anti-dust structure for a sliding block of a linear guideway in accordance with the present invention.
Figure 4:
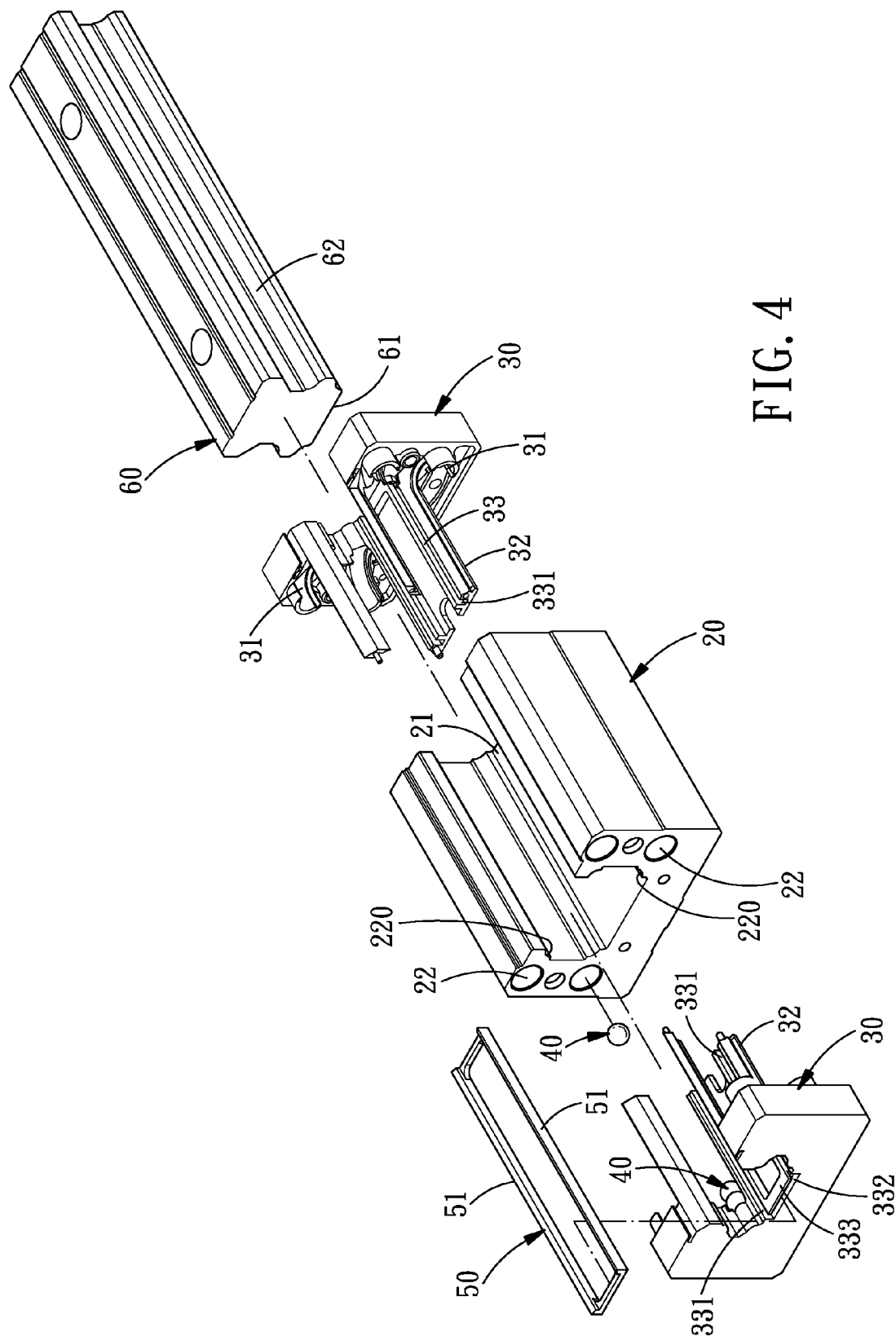
FIG. 4 is an exploded view of the anti-dust structure for a sliding block of a linear guideway in accordance with the present invention.
Figure 5:
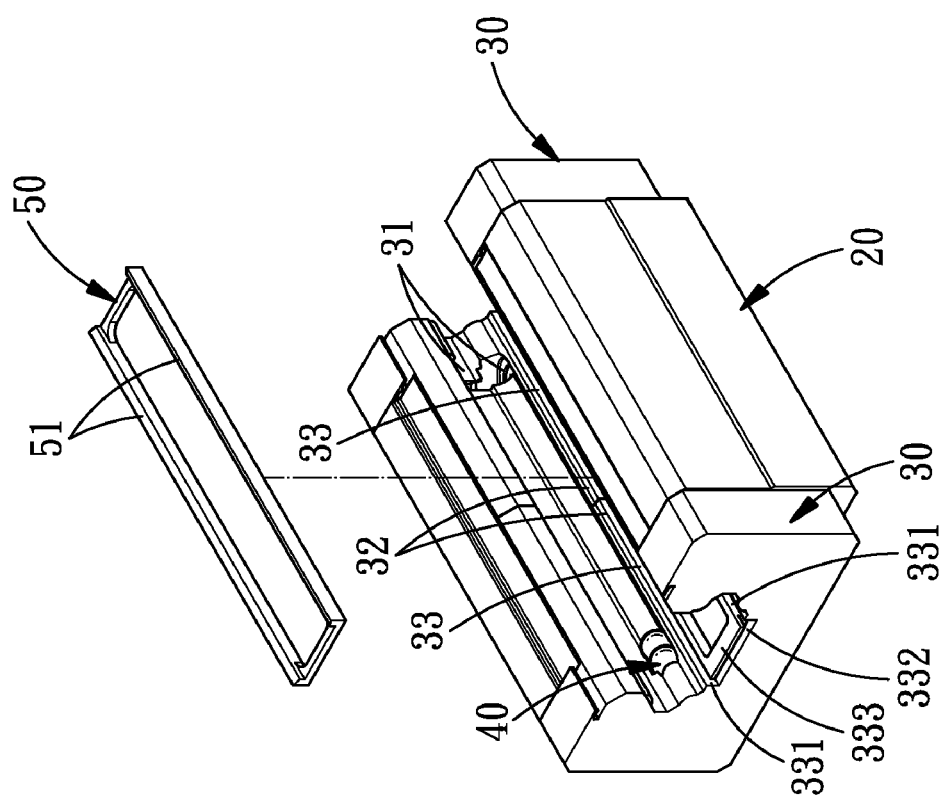
FIG. 5 is an exploded view showing a flexible anti-dust strip and an assembly of a sliding block and end caps and in accordance with the present invention.

Referring to FIGS. 3-5, an anti-dust structure for a sliding block of a linear guideway in accordance with the present invention comprises a sliding block 20, two end caps 30, plural rolling elements 40, a flexible anti-dust strip 50 and a rail 60.

The sliding block 20 includes an inner surface 21 and is provided with a plurality of first and second rolling channels 22, 220 in the thickness and the inner surface 21 of the sliding block 20.

The end caps 30 are each provided with a plurality of circulating holes 31 for cooperating with the first and second rolling channels 22, 220 to define a circulating path. The two end caps 30 are assembled to two ends of the sliding block 20, respectively. The two end caps 30 are each axially formed with a linking portion 32 which is extended from and vertical to the inner surface of the respective end caps 30. One of the linking portions 32 is defined with a [-shaped positioning groove 33, and the other of the linking portions 32 is defined with a ]-shaped positioning groove 33, so that after the two linking portions 32 of the two end caps 30 are assembled to each other, the two positioning grooves 33 will define an endless positioning groove including two longitudinal grooves 331 and two transverse grooves 332. The two longitudinal grooves 331 are parallel to the axis of the inner surface 21 of the sliding block 20, and the two transverse grooves 332 are disposed in the end edges of the end caps 25, respectively. Furthermore, the two transverse grooves 332 are each formed on an outer edge thereof with a protrusion 333.

The rolling elements 40 roll through the first and second rolling channels 22, 220 and the circulating holes 31 and circulate in the circulating path.

Figure 6:
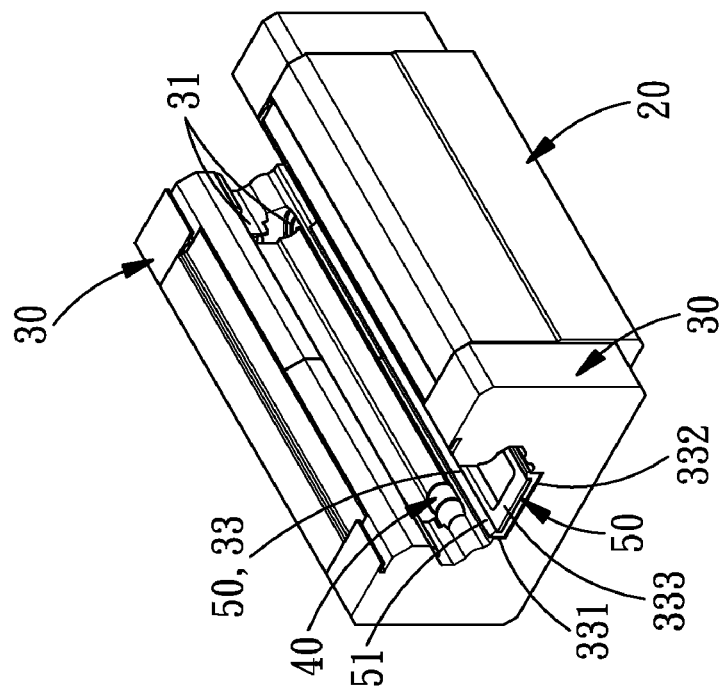
FIG. 6 is an assembly view of the sliding block, the end caps and the flexible anti-dust strip in accordance with the present invention.
Figure 8:
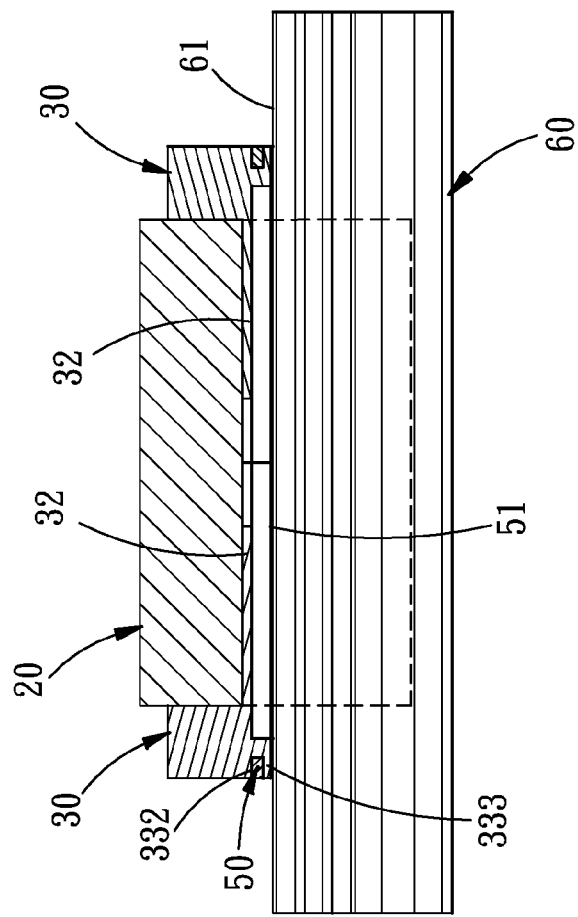
FIG. 8 is a side cross-sectional view showing the operational state of the anti-dust structure for a sliding block of a linear guideway in accordance with the present invention.
Figure 7:
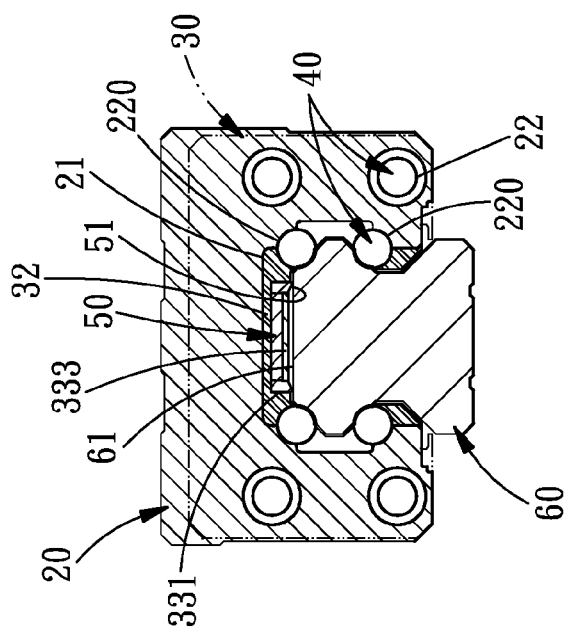
FIG. 7 is a front cross-sectional view showing the operational state of the anti-dust structure for a sliding block of a linear guideway in accordance with the present invention.

The flexible anti-dust strip 50 is in the form of a rectangular ring and sized correspondingly to the positioning groove 33 of the end caps 30. The flexible anti-dust strip 50 is integrally formed with two protruding lip portions 51 for mating with the two longitudinal grooves 331 of end caps 30, and the flexible anti-dust strip 50 is elastically inserted (or squeezed) in the positioning groove 33 of the end caps 30 in such a manner that the protruding lip portions 51 protrude out of the two longitudinal grooves 331. In addition, the flexible anti-dust strip 50 is pressed into the two transverse grooves 332 and restricted by the protrusions 333 of the two transverse grooves 332, preventing the disengagement of the flexible anti-dust strip 50. As shown in FIGS. 6-8, the anti-dust strip 50 is positioned firmly since the longitudinal grooves 331 restrict the transverse movement of the flexible anti-dust strip 50, the transverse grooves 332 restrict the longitudinal movement of the flexible anti-dust strip 50, and the protrusions 333 avoid of the falling-off of the flexible anti-dust strip 50.

The rail 60 includes a top surface 61 and is provided with a rolling element retaining portion 62 corresponding to the first and second rolling channels 22, 220 of the sliding block 20. The sliding block 20 is moveably mounted on the rail 60 through the rolling elements 40. The two end caps 30 are assembled to two ends of the sliding block 20, respectively. The flexible anti-dust strip 50 is combined to the two end caps 30, and the protruding lip portions 51 of the flexible anti-dust strip 50 abut against the top surface 61 of rail 60, as shown in FIGS. 7-8.

The aforementioned is the summary of the positional and structural relationship of the respective components of the present invention, and whether the flexible anti-dust strip 50 is a closed rectangular ring or not is not considered as the most important characteristic of the invention. Unclosed flexible anti-dust strip 50 can also be positioned in the positioning groove 33 of end caps 30, and the two transverse portions of the anti-dust strip 50 are still restricted by the protrusions 333 without disengagement from the positioning groove 33. In addition, the flexible anti-dust strip 50 can be formed with a concave or convex portion to be engaged with a convex or concave portion of the positioning groove 33, so as to realize the same positioning effect.

During assembly, with the flexibility, the flexible anti-dust strip 50 can be assembled without using any tools, so that the user only needs to expand the flexible anti-dust strip 50 outward and then makes it engage in the positioning groove 33. After assembly, the protruding lip portions 51 will abut against the top surface 61 of the rail 60, effectively preventing grease or dust from entering the circulating path defined by the first and second rolling channels 22, 220 and the circulating holes 31 via the top surface 61 of the rail 60, making the rolling elements 40 roll more smoothly, reducing the friction, and prolonging the service life of the product of the present invention.

With the above structure, the present invention has the following advantages: the anti-dust structure for a sliding block of a linear guideway of the present invention is simple in structure and economic. It only needs to provide a positioning groove 33 in the ends caps 30 at both ends of the sliding block 20 correspondingly to the circulating path, and position a flexible anti-dust strip 50 having protruding lip portions 51 in the positioning groove 33, so that the flexible anti-dust strip 50 can scrape off the grease and dust accumulated on the top surface 61 of the rail 60 at all times, preventing the dust and grease entering the upper rolling element groove via the top surface 61 of the rail 60. Therefore, the anti-dust structure for a sliding block of a linear guideway of the present invention is really simply-structured and low costless.

While we have shown and described various embodiments in accordance with the present invention, it should be clear to those skilled in the art that further embodiments may be made without departing from the scope of the present invention.

What is claimed is:

1. An anti-dust structure for a sliding block of a linear guideway comprising a sliding block, two end caps, plural rolling elements, a flexible anti-dust strip and a rail; wherein:

the sliding block is provided with an inner surface and a plurality of first and second rolling channels in a thickness and the inner surface and thereof;

the end caps are each provided with a plurality of circulating holes for cooperating with the first and second rolling channels of the sliding block to define a circulating path, the two end caps are assembled to two ends of the sliding block, respectively, the two end caps are each axially formed with a linking portion which is extended from and vertical to an inner surface of the respective end caps, and one of the linking portions is defined with a [-shaped positioning groove, and the other of the linking portions is defined with a ]-shaped positioning groove, so that after the two linking portions of the two end caps are assembled to each other, the two positioning grooves will define an endless positioning groove including two longitudinal grooves and two transverse grooves, the two longitudinal grooves are parallel to an axis of the inner surface of the sliding block, the two transverse grooves are disposed in two end edges of the two end caps, respectively;

the rolling elements roll through the first and second rolling channels and the circulating holes and circulate in the circulating path defined by the first and second rolling channels and the circulating holes;

the flexible anti-dust strip is sized correspondingly to the positioning groove of the end caps, the flexible anti-dust strip is integrally formed with two protruding lip portions for mating with the two longitudinal grooves of the end caps, the flexible anti-dust strip is disposed in the two longitudinal grooves and the two transverse grooves of the positioning groove of the end caps, the protruding lip portions of the flexible anti-dust strip protrude out of the two longitudinal grooves, the longitudinal grooves restrict a transverse movement of the flexible anti-dust strip, the transverse grooves restrict a longitudinal movement of the flexible anti-dust strip; and the rail includes an top surface and is provided with rolling element retaining portions corresponding to the first and second rolling channels, the sliding block is moveably mounted on the rail through the rolling elements, the two end caps are respectively assembled to the two ends of the sliding block, the flexible anti-dust strip is combined to the two end caps, and the protruding lip portions of the flexible anti-dust strip abut against the top surface of the rail.

2. The anti-dust structure for a sliding block of a linear guideway as claimed in claim 1, wherein the two transverse grooves of the positioning groove of the end caps are each formed on an outer edge thereof with a protrusion in such a manner that when the flexible anti-dust strip is disposed in the positioning groove, the flexible anti-dust strip is restricted by the protrusions on the outer edges of the traverse grooves.

3. The anti-dust structure for a sliding block of a linear guideway as claimed in claim 1, wherein the flexible anti-dust strip is shaped in the form of an unclosed rectangular ring and formed with a concave or convex portion for engaging with a convex or concave portion of the positioning groove.

\* \* \* \* \*